United States Patent [19]

Hwo

[11] Patent Number: 5,369,181
[45] Date of Patent: Nov. 29, 1994

[54] OLEFINIC POLYMER BLENDS FOR IMPROVING POLYOLEFINS

[75] Inventor: Charles C. Hwo, Sugar Land, Tex.

[73] Assignee: Shell Oil Company, Houston, Tex.

[21] Appl. No.: 99,017

[22] Filed: Jul. 29, 1993

[51] Int. Cl.⁵ .................. C08L 23/20; C08L 23/10
[52] U.S. Cl. .................. 525/240; 524/528; 524/490; 525/88
[58] Field of Search .............. 525/240, 88; 524/528

[56] References Cited

U.S. PATENT DOCUMENTS

| | | | |
|---|---|---|---|
| H1,213 | 7/1993 | Hwo | 525/240 |
| 3,849,520 | 11/1974 | Bullard et al. | 525/240 |
| 4,230,767 | 10/1980 | Isaka et al. | 428/349 |
| 4,657,982 | 4/1987 | Breck et al. | 525/240 |
| 4,665,130 | 5/1987 | Hwo | 525/240 |
| 4,808,662 | 2/1989 | Hwo | 524/74 |
| 4,960,820 | 10/1990 | Hwo | 524/528 |

FOREIGN PATENT DOCUMENTS

| | | | |
|---|---|---|---|
| 457568 | 11/1991 | European Pat. Off. | 524/528 |
| 1938913 | 7/1969 | Germany | 524/528 |

*Primary Examiner*—Carman J. Seccuro, Jr.
*Attorney, Agent, or Firm*—James O. Okorafor

[57] ABSTRACT

It is disclosed a polyolefin blend having an exhibiting improved processability and mechanical properties comprising of a major amount of a high molecular weight or low melt flow polyolefin, and minor amounts of a high melt flow polyolefin and an ordinary melt flow polyolefin copolymer. The improvement in processability, optical, and mechanical properties is synergistic, and is particularly evident by the improvement in output rate and dart drop impact strength.

4 Claims, No Drawings

OLEFINIC POLYMER BLENDS FOR IMPROVING POLYOLEFINS

FIELD OF THE INVENTION

This invention generally relates to polyolefins. More particularly, this invention relates to a polyolefinic blend which is useful in improving the processability, optical, and mechanical properties of other polyolefins.

BACKGROUND OF THE INVENTION

Polyolefin polymers are very well known in the art. Methods of manufacturing and/or processing polyolefins are likewise well known in the art. These methods of processing include but are not limited to blow molding, injection molding, pultrusion and pulforming, and extrusion. The problems associated with each of these processes are known, and seeking solutions to these problems, and/or improvements in processing conditions and equipment remains of interest to the art and industry.

For example, it is known that olefinic homopolymers such as high-density polyethylenes (HDPE) and polypropylenes generally have poor processability and poor impact properties. Because of the wide commercial uses of these polymers in various applications such as automotives, households, and. packaging, it is always desirable to discover new methods, additives, and/or equipment which enable these polymers to be better and more economically processed, and to improve the mechanical and other properties of these polymers and/or products made from the polymers.

SUMMARY OF THE INVENTION

It is an object of this invention to provide a polyolefin blend having and exhibiting improved processability.

It is a further object of this invention to provide a polyolefin blend having and exhibiting improved mechanical and optical properties.

Accordingly, it is now provided a polyolefin blend having an exhibiting improved processability, optical, and mechanical properties comprising of a major amount of a high molecular weight or low melt flow polyolefin, and minor amounts of a high melt flow polyolefin and an ordinary melt flow polyolefin copolymer. The improvements in processability and mechanical properties are synergistic, and are particularly evident by the improvement in output rate and dart drop impact strength.

DETAILED DESCRIPTION OF THE INVENTION

Since the following terms will be used throughout the specification, particular definitions are now provided:

The term high melt flow polymer shall mean a polymer having a melt flow of greater than 45 g/10 min.

The term ordinary melt flow polymer shall mean a polymer having a melt flow of from 0.1 to 40 g/10 min.

The term low melt flow polymer shall mean a polymer having a melt flow of less than 20 g/10 min.

All melt flow values, unless otherwise indicated, were measured by the procedure of ASTM D1238 Condition L at 230° C.

Very broadly speaking, the materials which are useful in the practice of this invention include high melt flow polyolefin polymers, ordinary melt flow polyolefin polymers, low melt flow polyolefin polymers, and conventional additives such as stabilizers and antioxidants. These polymers are generally processable, and are used in the manufacture of films and formed parts. These polymers include, polyethylene, styrene, polybutylene (poly-1-butene), polyketone, polypropylene, polyisoprene, polymethylpentene and their copolymers. Polypropylene, high-density polyethylene, polybutylene homo and copolymers are the preferred polyolefin polymers.

The high melt flow and ordinary melt flow polyolefin can be a homo or copolymer. The useful poly-1-butene homo or copolymer can be isotactic, elastomeric, syndiotactic, or it can have any characteristic that is known or expected of poly-1butene. The poly-1-butene homopolymers have a melt flow in the range of from about 45 to 1500, with a preferred range of from about 100 to 1000, and a particularly preferred range of from 200 to 750 g/10 min. The poly-1-butene copolymers have a melt flow in the range of from about 0.1 to 40, with a preferred range of from about 0.4 to 20, and a particularly preferred range of from about 2 to 10 g/10 min. These poly-1-butene polymers including their methods of preparation, and their properties are known in the art. An exemplary reference containing additional information on polybutylene is U.S. Pat. No. 4,960,820 which is herein incorporated by reference.

The particularly preferred poly-1-butene polymer is Duraflex ® PB DP0800. This poly-1-butene homopolymer has a melt flow of 490 g/10 min. at 230° C. and a weight average molecular weight of 108,000. Duraflex ® PB DP0800 is commercially available, and can be obtained from Shell Chemical Company of Houston, Tex.

The low melt flow polyolefin can be a homo or copolymer of for example, polypropylene. The polypropylene used in the present invention is any crystallizable polypropylene. The polypropylene can be prepared by homopolymerizing propylene irrespective of the method used so long as a crystallizable polypropylene is formed. The preferred polypropylenes are the substantially isotactic polypropylenes prepared by the Ziegler/Natta or $MgCl_2$-supported catalyst polymerization process.

The propylene polymers usable herein can be either propylene homopolymers or copolymers. If propylene copolymers are used, they can be random or block copolymers with a comonomer content preferably 1–30 mole % of either ethylene, butene, or an alpha olefin having from 5 to 8 carbon atoms.

Propylene polymers useful in the invention preferably have a melt flow of less than 20.0, more preferably from about 1.0 to 10.0 g/10 min. A particularly suitable propylene, has a melt flow of 2.8 g/10 min. and is available from Shell Chemical Company, of Houston, Tex. as PP5A08.

The high density polyethylene (HDPE) useful herein includes all HDPEs known in the art. Typically, such HDPE polymers have a density of greater than 0.930 g/cc, and preferably from about 0.940 to 0.960 g/cc. The melt flow of useful HDPEs is preferably less than 20, and more preferably from about 1.0 to 10.0 g/10 min. A particularly preferred HDPE has a melt flow of about 4 g/10 min. and a density of about 0.944 g/cc. This HDPE is available from Hoechst Corporation of Houston, Tex. as Hostalen GF 7740.

One or more additives may be added to the ternary blend comprising a major amount of a high melt flow polyolefin and minor amounts of a high melt flow polyolefin and an ordinary melt flow polyolefin copolymer. It is contemplated that the additive can be a filler, a mold release agent, U.V. stabilizers, thermal stabilizer, slip agent, antiblock agent, nucleating agent, pigment, antioxidants, flame retardants or combination thereof. The additive(s) can be added in an amount of up to between about 0.1 to about 1% by weight, based on the total weight of the composition. The additive may be added to one or more of the principal components prior to blending those components. Alternatively, the additive may be added to the blend during the actual blending of the principal components. Additionally, additive may be added to the formulation after blending of the principal components has occurred.

The components in the novel blend can be combined in amounts of no more than about 10% by weight of the poly-1-butene polymer, with at least about 90% by weight of propylene polymer. Optionally, from 0.1 to 1% by weight of an additive or combination of additives such as those listed above can be added to the blend. A preferred blend is prepared with 3% by weight of a high melt flow poly-1-butene homopolymer (melt flow greater than 200 to 750 g/10 min.) and 3% by weight of an ordinary melt flow poly-1-butene copolymer (melt flow from about 2.0 to 10 g/10 min.) with 94% by weight of a propylene homopolymer (melt flow from about 1.0 to 15 g/10 min.).

Blending of the components of the inventive formulation can occur by one of several methods such as by, tumble blending, masterbatch, or melt compounding techniques. The method of combining the ingredients of the formulation is not matter except as to the ultimate commercialization of the product. For example, in some cases, it is desirable to use the least amount of energy to merge the components into an effective blend.

After blending, the compositions of this invention can be formed into sheets or articles on conventional manufacturing equipment. Sheets can be formed using conventional casting equipment, that is, the formulation can be cast, then passed through a die and then placed into a solid phase pressure forming device which produces the sheets. Also, films can be prepared from the sheets by stretching or orienting the sheets or alternatively, by using tubular film blown processing equipment. These processing techniques are well known in the art. Other articles of manufacture can be formed from the blend or the sheets using conventional molding equipment, such as by thermoforming or SPPF (solid phase pressure forming).

The invention is further illustrated by the following non-limiting examples and tables.

EXAMPLE

Referring to Table I, formulations 2 through 5 were prepared by dry tumbling for at least 30 minutes in a fiber drum at room temperature. The dry tumbled blends were then fed through extruders and a film casting die of about 11 inches in width. The melt temperature of the extrudate at the exit of the die was at about 450° F. Film of about 2 mils in thickness were then prepared by casting the extrudate on a chill roll with surface temperature at about 50° F. The cast films were wounded with a paper core by a winder. The output rate of the extrudate of each formulation was measured by collecting the extrudate at the die exit for 5 minutes and converted to grams per hour as listed in Table 2. The film properties were tested using the corresponding test methods noted in the footnote of Table 2.

TABLE 1

Formulation List 1. 100% Polypropylene (Shell NRD51165)-Control
2. 97% Polypropylene (Shell NRD51165) + 3% PB (Shell DP0800)
3. 94% Polypropylene (Shell NRD51165) + 3% PB (DP0800) + 3% PB (Shell DP8310)
4. 97% Polypropylene (Shell NRD51165) + 3% PB (Shell PB0400)
5. 94% Polypropylene (Shell NRD51165) + 3% PB (Shell PB0400) + 3% PB (Shell DP8310)

Note:
DP0800 is a butene-1 homopolymer with melt flow (MI) = 490.
DP8310 is butene-1-ethylene copolymer with ethylene content = 5.5 w % and MI = 10.
PB0400 is a butene-1 homopolymer with melt flow (MI) = 49.
NRD51165 is a polypropylene homopolymer with MI = 10.
Melt Index (MI) is per ASTM D1238, Condition "L" at 230° C.

TABLE 2

Cast Film Properties

| Formulation | Control 1 | 2 | 3 | 4 | 5 |
|---|---|---|---|---|---|
| Film Thickness, mils | 1.85 | 2.25 | 1.75 | 1.80 | 1.80 |
| Output Rate, g/hour | 2770 | 2852 | 3100 | 2802 | 3045 |
| Dart Drop Strength, grams | | | | | |
| @ 23° C. | 271 | 341 | 470 | 301 | 530 |
| @ 0° C. | 23.5 | 66.0 | 71.0 | 81 | 91.0 |
| Haze, % | 1.2 | 1.0 | 1.0 | 0.9 | 1.0 |
| Clarity, % | 69.4 | 69.2 | 70.2 | 73 | 74.6 |
| Tensile Strength, psi | | | | | |
| MD | 5780 | 6090 | 5850 | 6375 | 5985 |
| TD | 5535 | 5150 | 5370 | 5635 | 5340 |
| Elongation, % | | | | | |
| MD | 756 | 853 | 778 | 840 | 782 |
| TD | 796 | 773 | 785 | 782 | 758 |

Note:
Haze and clarity were determined by a haze meter per ASTM D1003.
Tensile Strength and Elongation were determined per ASTM D882.
Dart Drop was determined per ASTM D1709, Method A, F50.

As indicated in Table 2, the addition of a small amount of a high melt flow olefinic homopolymer (DP0800) and a small amount of ordinary melt flow olefinic copolymer (DP8310) exhibits a synergistic effect towards improving the processability (higher product rate) and the impact properties (greater dart drop impact strength) of low melt flow olefinic polymer (NRD51165). Comparing formulations 2 and 1, the addition of a small amount (3 wt %) of high melt flow homopolymer (DP0800) increases the output rate of polypropylene film production. Comparing formulations 1, 2, and 3, the addition of a small amount (3 wt %) of ordinary melt flow copolymer (DP8310) further increases very substantially the output rate and impact strength (dart drop impact strength) of polypropylene films. Comparing formulation 4 and 1, the addition of a small amount of ordinary melt homopolymer (PB0400) only slight increases the output rate of the polypropylene film production. Comparing formulations 1, 4, and 5, the addition of a small amount of ordinary melt flow polymer (DP8310) increases the output rate and the impact strength (dart drop impact strength) of polypropylene film. The improvements in optical properties is particularly evident from the increased clarity values of formulations 3-5.

Thus, the experimental data summarized in Table 2 shows the synergistic improvements in processability and mechanical properties resulting from the use of the inventive blend, and also demonstrates an improvement in the optical properties of the low melt polyolefin.

While this invention has been described in detail for the purpose of illustration, it is not to be construed as limited thereby but is intended to cover all changes and modifications within the spirit and scope thereof.

What is claimed is:

1. A blend having and exhibiting improved processing and mechanical properties comprising:
   more than 90 wt % of polypropylene having a melt flow of less than 20 g/10 min;
   a positive amount to less than 10 wt % of poly-1-butene copolymer having a melt flow of from about 0.1 to 40 g/min; and
   a positive amount to less than 10 wt % of poly-1-butene homopolymer having a melt flow of greater than 45 g/10 min.

2. An article of manufacture made from the blend of claim 1.

3. A blend as in claim 1 further comprising from about 0.1 to 1 wt % of additives selected from the group consisting of a filler, a mold release agent, U.V. stabilizers, thermal stabilizer, slip agent, antiblock agent, nucleating agent, pigment, antioxidants, or flame retardants.

4. A blend having and exhibiting improved processing and mechanical properties comprising:
   polypropylene having a melt flow of about 2.8 g/10 min. in an amount of about 94 wt %.
   poly-1-butene homopolymer having a melt flow of about 490 g/10 min. in an amount of about 3 wt %; and
   poly-1-butene copolymer having a melt flow of about 10 g/10 min. in an amount of about 3 wt % of the total blend composition.

* * * * *